US010241517B2

(12) United States Patent
Pasteau et al.

(10) Patent No.: US 10,241,517 B2
(45) Date of Patent: Mar. 26, 2019

(54) METHOD FOR CORRECTING A TRAJECTORY IN A PERSONAL MOVEMENT ASSISTANCE DEVICE EQUIPPED WITH SENSORS

(71) Applicant: INSTITUT NATIONAL DES SCIENCES APPLIQUÉES DE RENNES (INSA DE RENNES), Rennes (FR)

(72) Inventors: François Pasteau, Acigne (FR); Marie Babel, Acigne (FR); Eric Bazin, Cesson Sevigne (FR); Sylvain Guegan, Boistrudan (FR)

(73) Assignee: INSTITUT NATIONAL DES SCIENCES APPLIQUÉES DE RENNES (INSA DE RENNES), Rennes (FR)

( * ) Notice: Subject to any disclaimer, the term of this patent is extended or adjusted under 35 U.S.C. 154(b) by 45 days.

(21) Appl. No.: 15/561,243

(22) PCT Filed: Mar. 21, 2016

(86) PCT No.: PCT/FR2016/050621
§ 371 (c)(1),
(2) Date: Sep. 25, 2017

(87) PCT Pub. No.: WO2016/151230
PCT Pub. Date: Sep. 29, 2016

(65) Prior Publication Data
US 2018/0129216 A1 May 10, 2018

(30) Foreign Application Priority Data

Mar. 24, 2015 (FR) ...................................... 15 00575

(51) Int. Cl.
*G05D 1/02* (2006.01)
*A61G 5/04* (2013.01)
*B60L 3/00* (2019.01)

(52) U.S. Cl.
CPC ............. *G05D 1/0214* (2013.01); *A61G 5/04* (2013.01); *B60L 3/0015* (2013.01);
(Continued)

(58) Field of Classification Search
CPC ...... A61G 5/04; G05D 1/0223; G05D 1/0255; G05D 1/0214; G05D 2201/0206;
(Continued)

(56) References Cited

U.S. PATENT DOCUMENTS

2007/0282228 A1* 12/2007 Einav ................. A63B 21/4021
601/33
2011/0130940 A1* 6/2011 Smithers .............. G05D 1/0055
701/99

(Continued)

FOREIGN PATENT DOCUMENTS

JP          07-110711 A      4/1995
WO     WO2014/011992 A2    1/2014

OTHER PUBLICATIONS

International Search Report and Written Opinion for PCT Patent App. No. PCT/FR2016/050621 dated Jul. 6, 2016 with English translation of ISR.

(Continued)

*Primary Examiner* — Mussa A Shaawat
(74) *Attorney, Agent, or Firm* — Kenealy Vaidya LLP

(57) ABSTRACT

Some embodiments are directed to a method for correcting a movement trajectory in a movement assistance device of a person equipped with at least one sensor device and a control unit, the method including the steps of measuring a distance between said at least one sensor and an obstacle, a
(Continued)

separation of a coordinate system representing pairs of values of translational speeds and rotational speeds into two half-planes, by at least one separating limit of the coordinate system, into a travel exclusion zone and a permissible travel space, a definition of a second rotational speed and a second translational speed by the projection of a command point into the delimited permissible space.

8 Claims, 2 Drawing Sheets

(52) U.S. Cl.
CPC ......... *G05D 1/0223* (2013.01); *G05D 1/0255* (2013.01); *B60L 2200/24* (2013.01); *B60L 2200/34* (2013.01); *B60L 2240/12* (2013.01); *B60L 2260/42* (2013.01); *G05D 2201/0206* (2013.01)

(58) Field of Classification Search
CPC ............... B60L 3/0015; B60L 2200/24; B60L 2240/12; B60L 2200/34; B60L 2260/42
See application file for complete search history.

(56) References Cited

U.S. PATENT DOCUMENTS

| | | |
|---|---|---|
| 2012/0101703 A1 | 4/2012 | Morita |
| 2014/0110915 A1* | 4/2014 | Maeda ................... A61G 5/046 280/93.506 |
| 2015/0051519 A1* | 2/2015 | Morbi ...................... A61H 1/02 601/26 |
| 2016/0193094 A1* | 7/2016 | Bertrand ................ A61G 3/063 414/344 |

OTHER PUBLICATIONS

Search Report from French Patent App. No. 1500575 dated Feb. 22, 2016.

* cited by examiner

METHOD FOR CORRECTING A TRAJECTORY IN A PERSONAL MOVEMENT ASSISTANCE DEVICE EQUIPPED WITH SENSORS

CROSS REFERENCE TO RELATED APPLICATIONS(S)

This application is a national phase filing under 35 C.F.R. § 371 of and claims priority to PCT Patent Application No. PCT/FR2016/050621, filed on Mar. 21, 2016, which claims the priority benefit under 35 U.S.C. § 119 of French Patent Application No. 1500575, filed on Mar. 24, 2015, the contents of each of which are hereby incorporated in their entireties by reference.

BACKGROUND

Some embodiments relate to the field of equipment for assisting the movement of persons, in particular such as motorised wheelchair devices that can be steered by a user from a control interface. In particular, some embodiments relate to a method for determining trajectory control parameters on the basis of information received by sensors positioned on the movement assistance equipment and of movement directive information transmitted by a user of the equipment via the control interface.

Equipment such as motorised wheelchairs is commonly used to assist with the movements of people with reduced mobility. These wheelchairs are controlled by the user thereof in a so-called "forward" or "reverse" movement and in a direction of travel with respect to a nominal movement axis (left or right direction). The speed and direction of travel directives are usually provided by a user by means of a "joystick"-type interface for example. Trajectory correction modes of such equipment exist in order to specify the movement trajectory as a function of elements specific to the environment, in particular such as obstacles. An environment analysis mode by the transmission and receipt of "ultrasonic" signals has already been developed, however the use thereof does not make it possible to correct the trajectory of a vehicle driven by an individual user at a nominal speed of travel. Applications already known to date concern, for example, robot servo-control or collision avoidance during a movement carried out in relation to a given command, independently from a passenger transport application.

The patent application WO2014/148978A1 entitled "Control System and Method for Control of a Vehicle in Connection with Detection of an Obstacle" (ANDERSON Jon et al., SCANIA CV AB; Priority Date: 19 Mar. 2013) discloses a control system in an autonomous vehicle designed to avoid a collision, and based on receiving information in connection with an obstacle present in a movement trajectory of the vehicle.

The patent application JP H07 110711A (NIPPON DENSO CO) of 25 Apr. 1995 discloses a robot suitable for moving and configured to avoid obstacles, in particular as a function of the position of and the distance to the obstacle.

Other systems exist and use technology implementing laser technology rangefinders to assess the proximity of obstacles; however, this technology is very expensive. Finally, a system exists that is based on the analysis of images produced from shots taken by one or more cameras, which makes it possible to define the position of a moving equipment item in an indoor environment (inside rooms), and allows obstacles to be avoided. However, it requires the use of at least one camera, or even two cameras in order to increase the reliability of the shots; problems also arise with regard to the detection of transparent surfaces.

The existing solutions have drawbacks, in particular in terms of the processing complexity and/or cost of implementation.

SUMMARY

Some embodiments aim to enhance or improve at least one of the drawbacks of the prior art by proposing a method for correcting a movement trajectory in a movement assistance device for at least one person, the movement assistance device being driven by at least one motor and directed by a steering control module, according to a first rotational speed and a first translational speed (which are determined according to one or more directives received by means of an input interface), the speed values constituting the coordinates of a command point in a movement coordinate system, the movement assistance device being equipped with at least one sensor device and a control unit, the sensor device being configured such that it performs a measurement in a defined direction relative to a movement axis of the movement assistance device, the method including the steps of:

measuring a distance between at least one sensor or a predetermined point of the movement assistance device and an obstacle present in the aforementioned direction (or in a defined volume about said direction), separating the normal coordinate system, representing pairs of values of translational speeds and rotational speeds, into two half-planes, using at least one separating straight line, one of the two half-planes corresponding to a permissible travel space, the other of the two half-planes corresponding to a travel exclusion zone of the movement assistance device, defining a second rotational speed and a second translational speed by projecting the command point into the permissible space thus determined, the projection of the command point thus defining a "control point" in the permissible travel space, controlling the one or more motors and the steering control module, respectively as a function of the second translational speed and the second rotational speed (i.e. as a function of the coordinates of the control point defined in the permissible travel space).

Each of the sensors present on the personal movement assistance device is configured to deliver one or more information items representing a distance separating them from an obstacle, to a control unit. According to one embodiment, the sensor devices are constituted from one or more ultrasonic transmitters and one or more ultrasonic receivers. According to one alternative, the sensors can include laser beam or infra-red beam transmitting and receiving elements, or camera devices which are coupled in pairs and suitable for extracting (generating) distance information or information representing a distance.

The improved method for correcting a trajectory according to some embodiments can be used regardless of the nature of the sensors used and provided that these sensors are suitable for delivering information on the distances between the predetermined points of a personal movement assistance device and one or more obstacles present around the device, when the device is guided by a user.

According to one embodiment, the user takes his/her place in the personal movement assistance device. According to one alternative, the user remotely guides the personal movement assistance device in the case that a second user has taken his/her place in the latter. In the case of remote guidance, the means for inputting the travel directives include wireless communication means (for example radiofrequency communication means such as those well known in the field of wireless information transmissions).

According to one embodiment, the projection of the command point into the permissible space is carried out by determining a control point falling within a straight line of the coordinate system passing through the origin of the coordinate system and through the command point defined by the translational and rotational speeds corresponding to the one or more input directives of the device.

According to one alternative embodiment, the projection of the command point into the permissible space is carried out by determining a control point falling within a straight line that is perpendicular to the separating straight line the closest to the aforementioned command point.

According to another alternative embodiment, the projection of the command point into the permissible space is carried out by determining a control point falling within a horizontal straight line passing through the command point.

Advantageously, before or after the projection of the command point, a step of managing the mechanical inertia of the movement assistance device includes a step of changing the coordinate system from the first coordinate system to a second coordinate system, the change in coordinate system including a reduction of the first coordinate system P by means of a scale reduction and a shift towards the positive values of the translational speeds of the origin of the first coordinate system giving rise to an origin of the second coordinate system.

According to one embodiment, the projection of the projected command point into a control point of the permissible space is such that the control point is positioned at a distance that is less than a predetermined value of at least one separating straight line. In other words, the projection of the command point is not strictly positioned on the straight line but at an arbitrarily defined distance within the permissible space delimited by the separating straight lines, however with a predetermined maximum value of the distance to the nearest line.

According to one alternative embodiment, the correction of a movement trajectory in a movement assistance device includes determining at least as many separating straight lines as there are sensors present on the movement assistance device.

BRIEF DESCRIPTION OF THE DRAWINGS

Some embodiments will be better understood, and other features and advantages will become apparent on reading the following description, provided with reference to the accompanying figures, in which.

DETAILED DESCRIPTION OF EXEMPLARY EMBODIMENTS

Figure 1:
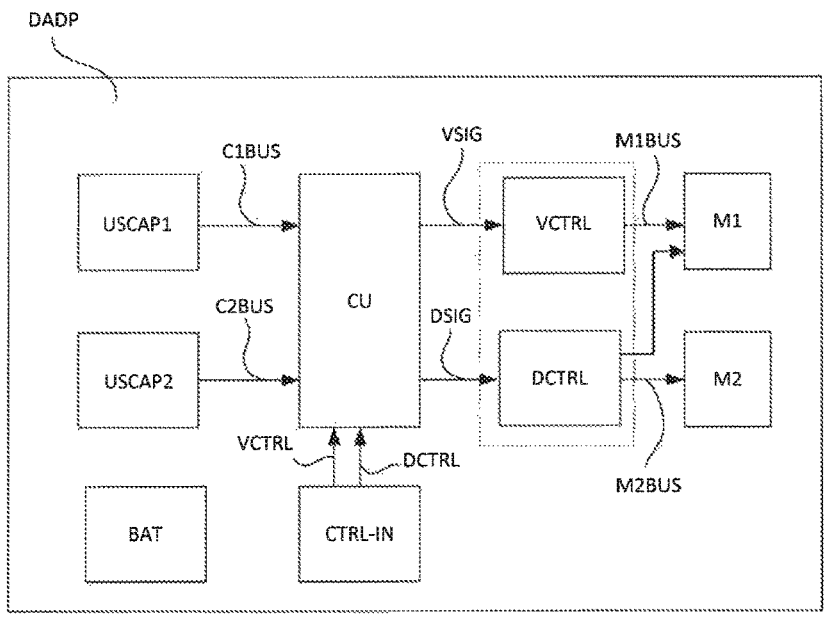
FIG. 1 shows the architecture of a personal movement assistance device according to one specific and non-limiting embodiment.

In FIG. 1, the modules shown are functional units, which may or may not correspond to physically distinguishable units. For example, these modules or some thereof are grouped together into a single component. Conversely, according to other embodiments, some modules are composed of separate physical entities.

FIG. 1 shows architectural elements of a personal movement assistance device DADP according to one specific and non-limiting embodiment. The device DADP includes at least one propulsion motor, or a set of propulsion motors represented by the functional module M1. According to a first embodiment, the device DADP further includes a second motor M2 making it possible to define the direction of travel. The propulsion and steering motors are respectively controlled by a speed control module VCTRL and a steering control module DCTRL. According to a second embodiment, the steering is controlled by modulating the speed of two propulsion motors respectively associated with a left wheel RG and a right wheel RD, such that, while controlling a determined average speed, a direction of travel is defined by the difference between the respective speeds of the left wheel and the right wheel, according to a differential mode. The speed and steering control modules VCTRL and DCTRL transmit control signals to the elements of the functional modules M1 and M2. M1 includes the one or more propulsion motors and M2 includes a steering motor, where necessary, according to the embodiment.

The modules VCTRL and DCTRL are controlled by the control unit CU which determines signals VSIG and DISG, derived from the information V3 and $\omega 3$, whereby V3 is derived from a merging of translational speeds V1 and V2, and whereby $\omega 3$ is derived from the merging of rotational speeds $\omega 1$ and $\omega 2$.

V1 and $\omega 1$ respectively represent information representative of a translational speed and a rotational speed received by the control unit CU according to a user directive established via the module CTRL-IN including a control joystick for example.

The control unit CU receives speed and travel directive information VCTRL and DCTRL from the user interface CTRL-IN of the device DADP. The various processing operations carried out by the control unit CU are in particular performed on the basis of the information produced by one or more sensors USCAP positioned on the movement assistance device DADP and by the travel directive information transmitted by a user.

The sensors USCAP1 and USCAP2 are sensors suitable for delivering signals representing the perceived environment (in respectively predefined directions relative to the direction of travel) on digital buses C1BUS and C2BUS, configured for transferring the information on the distances to one or more obstacles into a processing memory of the control unit CU.

All modules are powered by an energy storage module BAT, which can be recharged from a mains power socket. The control unit CU includes modules CU1, CU2 and CU3. The module CU1 is a module for determining directive speeds and corrected speeds of a reference coordinate system P representing pairs of translational speed and rotational speed values. CU2 is a module for defining a rotational speed $\omega 3$ and a translational speed V3, as a function of the information received by the one or more sensors (USCAP) and of corrected speed values corrected by the correction method according to one embodiment. CU3 is a control unit suitable for controlling the one or more travel motors (functional block M1) and the steering control module, respectively as a function of a third translational speed V3 and a rotational speed ω3. According to one embodiment, V3 and ω3 are respectively equal to V2 and ω2. Alternatively, V3 and ω3 are calculated to take into account the mechanical inertia specific to the personal movement device transporting a user.

According to one specific and non-limiting embodiment, the control unit modules cited include all of the conventional architectural elements of a control unit, such as one or more microcontrollers, one or more volatile working memories (random access memories), one or more non-volatile storage memories, data communication buses, one or more buffer circuits, a reset circuit, power supply and power supervision circuits, one or more clock circuits, and any other function traditionally useful for the implementation of control functions. The architecture of each of these modules is not described further herein, as it is not useful to the understanding of some embodiments.

According to one specific and non-limiting embodiment, the control unit CU performs a representation of a translational speed and a rotational speed as defined by means of the joystick-type input interface of the personal movement assistance device in a normal coordinate system P (ω,) in which:
the X-axis ωS represents rotational speed values ω and
the Y-axis Vs represents translation speed values ν (or V).

The translational speed values can be indifferently written as either ν or V in the paragraphs herein below. Thus, by way of example, the writing v1 corresponds to a discrete value V1 of the magnitude ν, which represents the instantaneous value of the translational speed of the device DADP.

The distances measured between the sensors USCAP1 and USCAP2 allow two straight lines LP1 and LP2 to be defined, said lines separating the total space of the coordinate system P (ω,) respectively into two half-planes for each of said straight lines and thus defining a prohibited space and a permissible travel space. Corrected speeds are then defined in the coordinate system P (ω,), by projecting a command point CP of the prohibited space into a control point CTRLP of the permissible space previously defined in the coordinate system P (ω,).

The use of the sensors USCAP indicating a distance relative to an obstacle also makes it possible to determine the orientation of the obstacle, and in particular when the sensors USCAP include a plurality of transmitter and/or receiver elements or when they are coupled to each other so as to identify a signal transmitted by a plurality of receivers. Therefore, and in the case of a wall for example, it is possible to carry out a measurement at two or more points of the obstacle, and to determine the orientation thereof in space.

According to one alternative embodiment, vertical and horizontal limits (straight lines) define the permissible travel space in correspondence with the maximum input directive limits (desired travel limits expressed by means of the input command via the input interface "joystick").

The determination of the one or more separating straight lines of the coordinate system P, which corresponds to a plane (ω, V), into half-planes, is carried out by the control unit, in particular as a function of the information representing the distances to the obstacles, transmitted by the one or more sensors USCAP (USCAP1, USCAP2, ... USCAPn).

According to one embodiment, an equation of a separating straight line of the coordinate system P (in the plane (ω, V)) is:

$$J_v v + J_\omega \omega \leq \lambda(s-s^*)$$

It is therefore an equation of a half-plane of the coordinate system P playing a role in defining the permissible travel space MA in P, and defined by at least one measurement of a distance s to an obstacle, where:
ν is the instantaneous translational speed of the device DADP, also called V,
ω is the instantaneous rotational speed of the device DADP,
λ is a constant,
s is the distance measured to the obstacle and
s* is the minimum distance to the obstacle, also known as the limit position of the sensor,
$J_v$ and $J_\omega$ are scalar components respectively derived from the speeds $c_v$ and $c_\omega$ of the corresponding sensor in the coordinate system (ω,v):

$$J_v = L_s T_v$$

$$J_\omega = L_s T_\omega$$

Where $L_s$ is a sensor-dependent interaction matrix (specific to the sensor and characterised during a design phase thereof).

$T_v$ and $T_\omega$ are matrix elements allowing the translational $c_v$ and rotational $c_\omega$ speeds of a given sensor of the device DADP to be defined as a function of the translational V and rotational ω speeds of the comprehensive device DADP (for example referenced through its centre of gravity).

The translational and rotational speeds of a sensor are defined according to the following formula:

$$\begin{bmatrix} c_v \\ c_\omega \end{bmatrix} = T_v T_\omega \begin{bmatrix} v \\ \omega \end{bmatrix}$$

$T_v$ and $T_\omega$ represent matrix elements specific to the personal movement assistance device DADP and characterised during a design phase thereof.

$L_s$ is the interaction matrix of a sensor; $c_v$ and $c_\omega$ are respectively the translational and rotational speeds of the sensor in the coordinate system (ω,v).

The following formula characterises the variation of the distance to an obstacle for a given sensor and taking into account the displacement of said sensor:

$$\dot{s} = L_s \begin{bmatrix} c_v \\ c_\omega \end{bmatrix}$$

According to one embodiment, the inertia is managed by mixing the determined current value of a speed with its previous value. This weighting takes place according to a calculation corresponding to the implementation of a low-pass filter.

According to one embodiment, the determinations of the translational and rotational speeds of the personal movement assistance device are configurable, in order in particular to promote a fluid movement or a movement such as to make a user feel confident.

The parameters can be defined by any input means associated with the control unit of the device DADP, such as, for example, configuration microswitches or the connection of a console suitable for configuration, etc. Thus, the configuration of the behaviour of the device, by means of the trajectory correction, is made accessible to personnel trained for this purpose, such as, for example, an occupational therapist, a medical assistant or a professional selling this type of equipment.

According to one embodiment and considering the conventional configuration of a personal movement assistance device, the device DADP includes fifteen sensors USCAP, each capable of including one or more transmitters and one or more receivers.

Alternatively, the device can include a number of sensors that is less than or greater than 15.

V1, V2 and V3 are discrete values of the magnitude of the translational speed V of the device DADP in the coordinate system v, ω (the coordinate system P), ω1, ω2, ω3 are discrete values of the magnitude of the rotational speed ω of the device DADP in the coordinate system v, ω (the coordinate system P).

Figure 2:
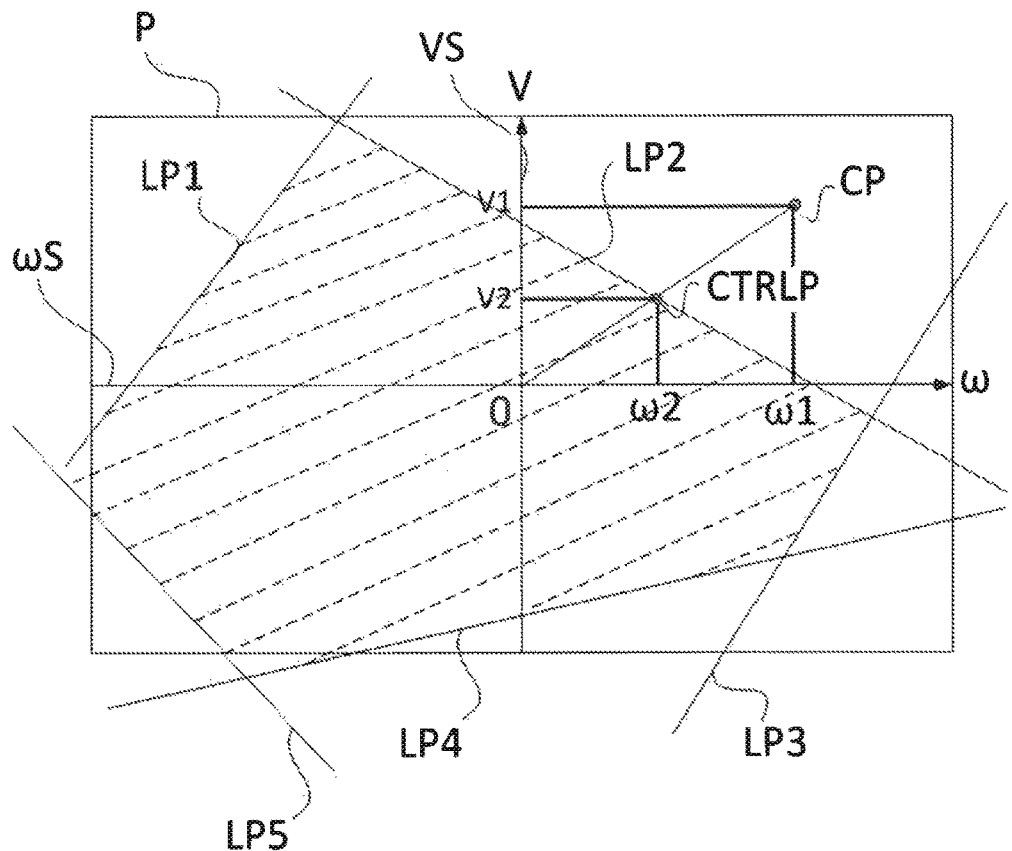
FIG. 2 shows a normal coordinate system in which speeds are defined, said speeds being derived from travel directives and speeds determined by the application of all or part of the method according to one specific and non-limiting embodiment.

FIG. 2 shows a normal coordinate system P in which speeds V1 and ω1 are defined, said speeds resulting from travel directives and speeds V2 and ω2 determined by the application of all or part of the method according to one specific and non-limiting embodiment. V1 and ω1 are derived from information (signals) VCTRL and DCTRL transmitted by the input interface module CTRL-IN of the personal movement assistance device. V1 represents the translational speed of the device DADP solicited by the input directive and ω1 represents the rotational speed of the device DADP solicited by the input directive. V1 and ω1 are therefore derived from the position of a joystick controlling the device DADP and the pair of values (V1, ω1) constitutes the coordinates of a command point CP in the normal coordinate system P.

According to the embodiment, a positive speed V1 corresponds to the forward movement of the device DADP and a negative speed V1 corresponds to the backward movement (reversing) of the device DADP. According to a similar convention, a positive speed ω1 corresponds to a left turn (when V1 is positive) and a negative speed ω1 corresponds to a right turn (when V1 is positive). A zero speed V1 simultaneously at a zero speed ω1 corresponds to the immobilisation of the device DADP. The coordinate system P, which is a normal coordinate system, is defined by the axes ωS and VS, respectively indicative of the rotational speed magnitude ω and the translational speed magnitude V. Each of the sensors USCAP1, USCAP2, USCAPn, consisting of one or more transmitter elements and/or one or more receiver elements, delivers an information item to the control unit UC of the movement assistance device DADP, said information item concerning the distance relative to any obstacle present in the detection field around the device DADP. Advantageously, when an obstacle is detected, the normal coordinate system P is separated into two half-planes (in particular as a function of the distance to the obstacle measured): one is prohibited in terms of travel and the other is authorised in terms of travel. For example, the sensor USCAP 1 makes it possible to define the separating line LP1 of the coordinate system P using a predefined calculation formula. The orientation of the line in the normal coordinate system P depends, among other things, on the position and orientation of the sensor USCAP1 on the movement assistance device DADP. The same applies to the sensor USCAP2 which, according to the same principle, makes it possible to define the separating line LP2 for separating the normal coordinate system P into two half-planes. One is authorised for travel, the other is prohibited for travel. The definition of the lines LP1, LP2, LPn, which is carried out dynamically during the travel of the device DADP over a theoretical route defined by the evolution of the travel directive (via the input joystick) allows for the dynamic definition of a so-called permissible travel space. In a clever manner, the improved trajectory correction according to some embodiments relies on the projection of the command point CP into the permissible travel space MA delimited by one or by a plurality of separating straight lines LP (LP1, LP2, . . . LPn).

According to a first alternative, the projection of the command point CP into the permissible space takes place by the definition of a control point CTRLP falling within a straight line passing through the origin of the coordinate system P and through the command point CP, defined by the input directive. According to a second alternative, the control point CTRLP is defined by the orthogonal projection of the command point CP onto the straight line LP the closest to the command point CP. According to another alternative, a horizontal or substantially horizontal projection of the command point CP is used to keep the translational speed of the device DADP at its maximum.

The speeds V2 and ω2 corresponding to a corrected trajectory are the coordinates (value of V and value of ω) in the permissible space of the normal coordinate system P, of the control point CTRLP defined by the projection of the command point CP.

In a clever manner, each of the alternatives allows for an improved adaptation of a user of the personal movement assistance device DADP according to the pathological profile thereof, where necessary. The alternative used has a direct impact on the reactivity, flexibility and self-confidence subjectively felt by a user of the device DADP. Moreover, the inertia is managed, in particular by shifting the speed values V and ω in the coordinate system P. This translation can be carried out by calibration and as a function of the characteristics specific to the device DADP and/or to a user thereof. Therefore, and according to one specific embodiment, a translational speed V3 and a rotational speed ω3 are defined in order to be communicated to the control modules VCTRL and DCTRL of the device DADP. In the absence of inertia management, the speeds V2 and ω2 are transmitted over the buses VSIG and DSIG.

Figure 3:
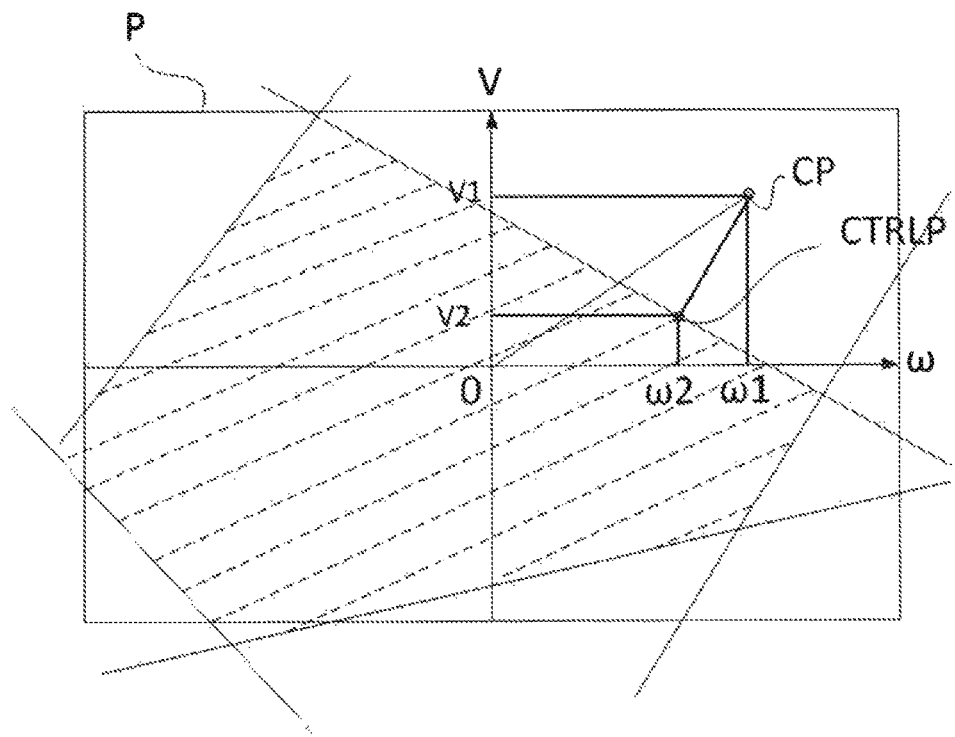
FIG. 3 shows a normal coordinate system in which speeds are defined, said speeds being derived from travel directives and speeds determined by the application of all or part of the method according to a first alternative embodiment.

FIG. 3 shows a normal coordinate system P in which speeds V2 and ω2 are defined by projection of the command point CP into a control point PCTRL located in the permissible travel space and on a straight line that is perpendicular to the separating straight line the closest to CP, according to one alternative embodiment.

Figure 4:
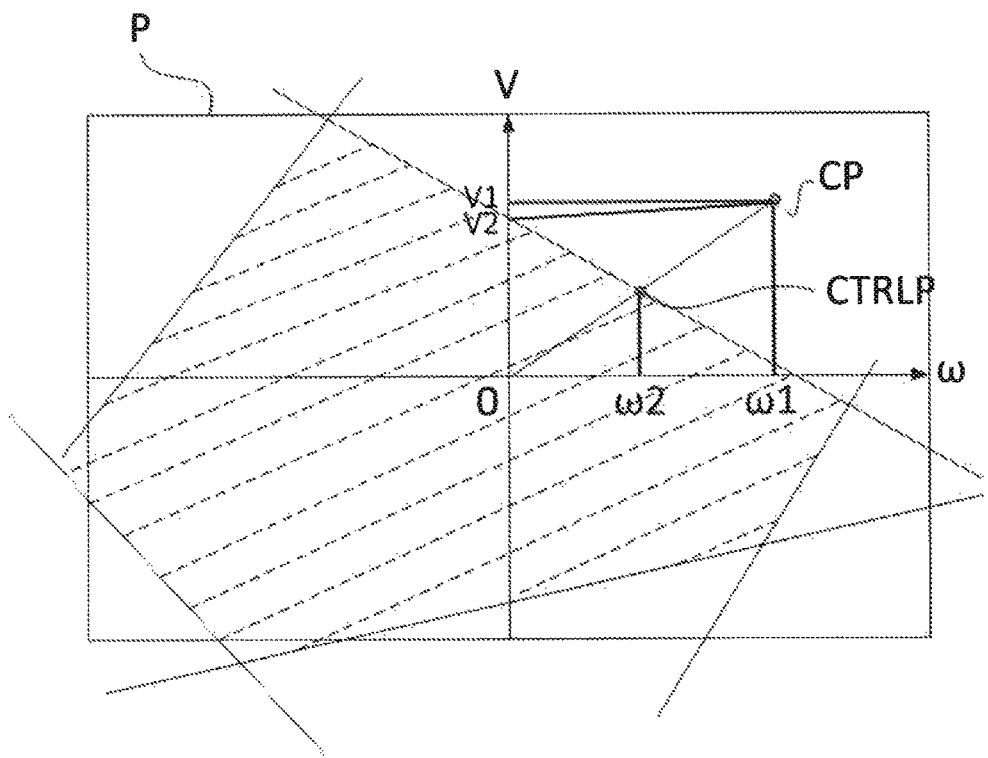
FIG. 4 shows a normal coordinate system in which speeds are defined, said speeds being derived from travel directives and speeds determined by the application of all or part of the method according to a second alternative embodiment.

FIG. 4 shows a normal coordinate system P in which speeds V2 and ω2 are defined by projection of the command point CP into a control point PCTRL located in the permissible travel space and on a straight line passing through the origin of the coordinate system P. However, and according to one alternative embodiment, the determined speed V2 is the highest possible translational speed in the permissible travel space and is less than or equal to the directive speed V1 of the command point CP.

Of course, other alternatives for defining the speeds V2 and ω2 are possible in the permissible travel space. The determination of these speeds within the travel space is not limited solely to the alternative embodiments described herein.

Advantageously, the control unit UC delivers a successive series of information representative of the corrections made to the trajectory, over a communication port, for example in order for the storage thereof in an associated memory. In this manner, the control unit UC indicates the position of the sensors having detected an obstacle (or an identification of the sensor, the distance to the obstacle, the position of the directive at the time of detection of the obstacle, etc.) for the purposes of performing a statistical analysis or a summary of the technical assistance (correction) provided to the user of the device DADP. It is thus possible to analyse the behaviour of a user and to adapt one or more control parameters of the device DADP as a function of the behaviour observed. The behaviour of a user is in practice related to the pathology and/or the nature of the traumas suffered by a user. For example, a user suffering from hemisensory neglect may not be aware of everything on one side. He/she may be able to situate himself/herself and reason with regard to movements on his/her right-hand side, for example, but not on his/her left-hand side. The correction will therefore be naturally more frequent in the case of movements taking place to the left (since this is the uncontrolled side) or if an obstacle is present on the left-hand side relative to a desired trajectory (because the user will not have seen said obstacle).

Advantageously, the implementation of the trajectory correction method according to some embodiments makes it possible to improve the movement trajectory while having a low computational complexity, a low power-consuming architecture (which provides the device DADP with greater autonomy), a high execution speed, low latency, and makes it easy to industrialise.

Moreover, the implementation of the method according to some embodiments allows for new modularity and flexibility, since various possible configurations adapt the movement assistance device DADP to suit a user's profile.

Therefore, the mode of projection into the permissible space produced depends on this configuration which is, for example, a pathological and/or psychological profile of a user.

Some embodiments further relate to any method for correcting a trajectory in a movement assistance device based on a determination of the presence of one or more obstacles by means of sensors, the method determining a translational speed and a rotational speed from one or more separating straight lines of a normal coordinate system P into a prohibited travel space and a permissible travel space, said coordinate system being a reference representative of the environment perceived in a direction of travel, the speeds thus determined being used respectively merged with speed and direction directives input by a user of the movement assistance device by means of a user interface adapted for the control thereof. Some embodiments further relate to any movement assistance device implementing such a method. Finally, some embodiments relate to any computer program product implementing the steps of the method according to one specific and non-limiting embodiment.

Some embodiments further relate to any method for correcting a trajectory in a movement assistance device based on a measurement of the distance between at least one sensor USCAP and an obstacle, a separation of a coordinate system P representing pairs $C_{V1\omega1}$ of values of translational speeds V1 and rotational speeds ω1 into two half-planes, by at least one separating limit LP separating a normal coordinate system P into a travel exclusion zone and a permissible travel space MA, possibly further delimited by input directive limits, and a definition of a second rotational speed ω2 and a second translational speed V2 by the projection of a command point CP into the delimited permissible space MA of the normal coordinate system P.

The invention claimed is:

1. A method for correcting a movement trajectory in a movement assistance device for at least one person, the movement assistance device being driven by at least one motor, and directed by a steering control module, according to a first rotational speed, and a first translational speed, which are determined according to one or more directives received by means of an input interface, the speed values constituting the coordinates of a command point in a movement coordinate system, the movement assistance device being equipped with at least one sensor device, and a control unit, the sensor device being configured such that it performs a measurement in a defined direction relative to the movement axis of the movement assistance device, the method comprising the steps of measuring a distance between the at least one sensor or a predetermined point of the movement assistance device and an obstacle present in the direction, and the method further includes the steps of:

separating, in particular according to the distance measured, the coordinate system, representing pairs of the values of translational speeds and rotational speeds into half-planes, using at least one separating straight line, one of the half-planes of the coordinate system corresponding to a permissible travel space, the other of the two half-planes corresponding to a travel exclusion zone of the movement assistance device, determining a second rotational speed and a second translational speed by projecting the command point into the permissible space, controlling the one or more motors and the steering control module, respectively as a function of the second translational speed, and the second rotational speed previously determined, the at least one separating straight line being defined by the equation:

$$J_v v + J_\omega \omega \leq \lambda(s-s^*)$$

wherein:
v is an instantaneous translational speed of the device,
ω is an instantaneous rotational speed of the device,
λ is a constant,
s is the distance measured, and
s* is a minimum distance measured to the obstacle, and
$J_v$ and $J_\omega$ are scalar components respectively derived from the speeds $^c v$ and $^c \omega$ of the corresponding sensor in the coordinate system.

2. The method for correcting a movement trajectory in a movement assistance device according to claim 1, wherein the projection of the command point into the permissible space is carried out by determining a control point falling within a straight line of the coordinate system passing through the origin of the coordinate system and through the command point.

3. The method for correcting a movement trajectory in a movement assistance device according to claim 1, wherein the projection of the command point into the permissible space is carried out by determining a control point falling within a straight line that is perpendicular to the at least one separating straight line the closest to the command point.

4. The method for correcting a movement trajectory in a movement assistance device according to claim 1, wherein the projection of the command point into the permissible space is carried out by determining a control point falling within a horizontal straight line passing through the command point.

5. The method for correcting a movement trajectory in a movement assistance device according to claim 1, wherein it further includes, before the projection of the command point, a step of managing the mechanical inertia of the device comprising changing the coordinate system from the first coordinate system to a second coordinate system, the change in coordinate system including a reduction of the first coordinate system by means of a scale reduction and a shift towards the positive values of the translational speeds of the origin of the first coordinate system giving rise to an origin of the second coordinate system.

6. The method for correcting a movement trajectory in a movement assistance device according to claim 1, wherein the projection of the projected command point into a control point of the permissible space is such that the control point is positioned at a distance that is less than a predetermined value of the at least one separating straight line.

7. The method for correcting a movement trajectory in a movement assistance device according to claim 1, wherein the method includes determining at least as many separating straight lines as there are sensors present on the movement assistance device.

8. A non-transitory computer readable storage medium, including instructions for carrying out the steps of the method according to claim 1.

\* \* \* \* \*